(12) United States Patent
Chesla (10) Patent No.: US 9,892,270 B2
(45) Date of Patent: Feb. 13, 2018

(54) SYSTEM AND METHOD FOR PROGRAMMABLY CREATING AND CUSTOMIZING SECURITY APPLICATIONS VIA A GRAPHICAL USER INTERFACE

(71) Applicant: Empow Cyber Security Ltd., Ramat Gan (IL)

(72) Inventor: Avi Chesla, Tel Aviv (IL)

(73) Assignee: Empow Cyber Security Ltd., Ramat Gan (IL)

( * ) Notice: Subject to any disclaimer, the term of this patent is extended or adjusted under 35 U.S.C. 154(b) by 200 days.

(21) Appl. No.: 14/952,069

(22) Filed: Nov. 25, 2015

(65) Prior Publication Data

US 2016/0078236 A1 Mar. 17, 2016

Related U.S. Application Data

(63) Continuation-in-part of application No. 14/615,020, filed on Feb. 5, 2015, now Pat. No. 9,565,204, and a
(Continued)

(51) Int. Cl.
*G06F 21/60* (2013.01)
*G06F 3/0484* (2013.01)
(Continued)

(52) U.S. Cl.
CPC .......... *G06F 21/604* (2013.01); *G06F 3/0484* (2013.01); *H04L 41/22* (2013.01);
(Continued)

(58) Field of Classification Search
CPC ..... G06F 21/604; G06F 3/0484; H04L 41/22; H04L 63/02; H04L 63/1408;
(Continued)

(56) References Cited

U.S. PATENT DOCUMENTS 7,930,746 B1 4/2011 Sheleheda et al.
7,933,989 B1 4/2011 Barker et al.
(Continued)

OTHER PUBLICATIONS

The International Search Report and the Written Opinion of the International Searching Authority for PCT/US2015/039664, ISA/RU, Moscow, Russia, dated Oct. 15, 2015.
(Continued)

*Primary Examiner* — Baotran N To
(74) *Attorney, Agent, or Firm* — M&B IP Analysts, LLC (57) ABSTRACT

A system and method for programmably creating a security application via a graphical user interface. The method comprises: causing a display of a service stage GUI window including at least one security phase zone; receiving a selection of at least one security service including at least one security decision engine; causing a display of an event rule stage window including at least one event rule parameters zone; receiving a selection of at least one event rule related to the at least one SDE; causing a display of an event relationship stage GUI window including at least one rule selection zone; receiving a selection of at least one workflow rule and at least one action; and configuring the security application based on the selected at least one work rule and the selected at least one action.

21 Claims, 8 Drawing Sheets

Related U.S. Application Data continuation-in-part of application No. 14/716,359, filed on May 19, 2015.

(60) Provisional application No. 62/085,844, filed on Dec. 1, 2014, provisional application No. 62/026,393, filed on Jul. 18, 2014.

(51) Int. Cl.
  *H04L 29/06* (2006.01)
  *H04L 12/24* (2006.01)

(52) U.S. Cl.
  CPC ............ *H04L 63/02* (2013.01); *H04L 63/145* (2013.01); *H04L 63/1408* (2013.01); *H04L 63/1416* (2013.01); *H04L 63/1425* (2013.01); *H04L 63/1441* (2013.01); *H04L 63/1483* (2013.01); *H04L 63/20* (2013.01)

(58) Field of Classification Search
  CPC ............. H04L 63/1416; H04L 63/1425; H04L 63/1441; H04L 63/145; H04L 63/1483; H04L 63/20
  USPC .................................................. 716/1, 22–25
  See application file for complete search history.

(56) References Cited

U.S. PATENT DOCUMENTS

| | | | |
|---|---|---|---|
| 8,150,783 B2 | 4/2012 | Gonsalves et al. | |
| 8,572,750 B2 | 10/2013 | Patel et al. | |
| 8,800,045 B2 | 8/2014 | Curtis et al. | |
| 9,565,204 B2 | 2/2017 | Chesla | |
| 9,628,507 B2 | 4/2017 | Haq et al. | |
| 2003/0233567 A1 | 12/2003 | Lynn et al. | |
| 2004/0114519 A1 | 6/2004 | MacIsaac | |
| 2004/0143756 A1 | 7/2004 | Munson et al. | |
| 2008/0086435 A1 | 4/2008 | Chesla | |
| 2008/0167567 A1 | 7/2008 | Bashour et al. | |
| 2008/0288430 A1 | 11/2008 | Friedlander et al. | |
| 2009/0043724 A1 | 2/2009 | Chesla | |
| 2011/0271341 A1 | 11/2011 | Satish et al. | |
| 2012/0096549 A1 | 4/2012 | Amini et al. | |
| 2012/0096551 A1 | 4/2012 | Lee et al. | |
| 2012/0096552 A1 | 4/2012 | Paek et al. | |
| 2012/0263382 A1 | 10/2012 | Robinson et al. | |
| 2012/0304007 A1 | 11/2012 | Hanks et al. | |
| 2012/0311132 A1 | 12/2012 | Tychon et al. | |
| 2013/0091085 A1 | 4/2013 | Sohn et al. | |
| 2013/0091150 A1 | 4/2013 | Jin et al. | |
| 2013/0097662 A1* | 4/2013 | Pearcy ................ | G06F 21/577 726/1 |
| 2013/0097706 A1 | 4/2013 | Titonis et al. | |
| 2013/0174256 A1 | 7/2013 | Powers | |
| 2013/0198840 A1 | 8/2013 | Drissi et al. | |
| 2013/0276122 A1 | 10/2013 | Sowder | |
| 2013/0333032 A1 | 12/2013 | Delatorre et al. | |
| 2014/0053267 A1 | 2/2014 | Klein et al. | |
| 2014/0068326 A1 | 3/2014 | Quinn | |
| 2014/0181972 A1 | 6/2014 | Karta et al. | |
| 2014/0215618 A1 | 7/2014 | Amit | |
| 2014/0283026 A1 | 9/2014 | Amit et al. | |
| 2014/0283050 A1 | 9/2014 | Amit | |
| 2014/0331279 A1* | 11/2014 | Aissi ..................... | G06F 21/53 726/1 |
| 2014/0337974 A1 | 11/2014 | Joshi et al. | |
| 2015/0058993 A1 | 2/2015 | Choi et al. | |
| 2015/0128274 A1 | 5/2015 | Giokas | |
| 2015/0242856 A1 | 8/2015 | Dhurandhar et al. | |
| 2016/0241581 A1 | 8/2016 | Watters et al. | |

OTHER PUBLICATIONS

The International Search Report and the Written Opinion of the International Searching Authority for PCT/US2015/060109, ISA/RU, Moscow, Russia, dated Mar. 10, 2016.

EP Search Report and Examiner's Opinion for European Patent Application No. EP 15 821755.4 dated Oct. 2, 2017, EPO, Munich, Germany.

* cited by examiner

SYSTEM AND METHOD FOR PROGRAMMABLY CREATING AND CUSTOMIZING SECURITY APPLICATIONS VIA A GRAPHICAL USER INTERFACE

CROSS-REFERENCE TO RELATED APPLICATIONS

This application is a continuation-in-part of U.S. patent application Ser. No. 14/615,020 filed on Feb. 5, 2015, now pending, which claims the benefit of U.S. Provisional Application No. 62/085,844 filed on Dec. 1, 2014, and U.S. Provisional Application No. 62/026,393 filed on Jul. 18, 2014. This application is also a continuation-in-part U.S. patent application Ser. No. 14/716,359 filed on May 19, 2015, now pending, which claims the benefit of the above-referenced U.S. Provisional Application Nos. 62/085,844 and 62/026,393. The above-referenced applications are hereby incorporated by reference for all that they contain.

TECHNICAL FIELD

The present disclosure relates generally to cyber security systems, and more particularly to real-time customizable and programmable cyber security systems for threat mitigation.

BACKGROUND

The Internet provides access to various pieces of information, applications, services, and vehicles for publishing information. Today, the Internet has significantly changed the way we access and use information. The Internet allows users to quickly and easily access services such as banking, e-commerce, e-trading, and other services people access in their daily lives.

In order to access such services, a user often shares his personal information such as name; contact details; highly confidential information such as usernames, passwords, bank account number, credit card details; and the like, with service providers. Similarly, confidential information of companies such as trade secrets, financial details, employee details, company strategies, and the like are also stored on servers that are connected to the Internet. There is a threat that such confidential data may be accessed by malware, viruses, spyware, key loggers, and various other methods of unauthorized access, including using legitimate tools (e.g., a remote desktop and remote processes services) that have been compromised to access or to install malware software that will allow access such information. Such unauthorized access poses great danger to unwary computer users.

Recently, the frequency and complexity level of attacks has increased with respect to attacks performed against all organizations including, but not limited to, cloud providers, enterprise organizations, and network carriers. Some complex attacks, known as multi-vector attack campaigns, utilize different types of attack techniques and target network and application resources in order to identify at least one weakness that can be exploited to achieve the attack's goals, thereby compromising the entire security framework of the network.

Another type of complex attack is an advanced persistent threat (APT). An APT is an attack in which an unauthorized hacker gains access to a network and remains undetected for a long period of time. The intention of an APT attack is usually to steal data rather than to cause direct damage to the network or organization. APT attacks typically target organizations in sectors with high-value information, such as the national defense, manufacturing, retail, and financial industries.

These attacks are frequently successful because modern security solutions are not sufficiently agile and adaptive with respect to detection, investigation and mitigation of resources needed to meet such evolving threats. Current security solutions cannot easily and promptly adapt to detect and mitigate new attack behavior, or attacks that change their behavior in a significant manner. In addition, current security solutions cannot easily and promptly adapt to new network technologies and topologies implemented by the entities to be protected.

For example, in modern computing platforms, such virtualization and software-defined networks (SDN) face real challenges to security systems. Such platforms host an enormous number of tenants with virtual distributed and dynamic resources. Each tenant can be removed or created in minutes and can be transformed into a malicious resource, thereby attacking its own "neighbors," tenants or remote network entities.

Specifically, currently available solutions suffer from drawbacks including lack of, for example, programmability capabilities, automatic mitigation, and collaboration. For example, a security defense system that is not programmable becomes ineffective in a matter of a few days or even a few hours because such security systems fail to resist or adapt to any new attack behavior in time.

Security solutions, and in particular solutions for APT attacks, do not provide reliable automatic mitigation capabilities. Typically, APT security solutions are not designed for both detection and automatic mitigation. In addition, system administrators do not trust currently available APT security solutions due to the high level of false positive alerts generated by such systems. As a result of such false positive alerts, system administrators must often manually perform mitigation actions rather than permit automatic mitigation, which usually prolongs the time to mitigate attacks.

Moreover, current security solutions do not share attack information and detection, investigation and mitigation solutions between different companies due to the risk of revealing confidential data of a protected entity. This lack of communication limits the ability to adapt one security system using information related to attack behavior detected by another system in another organization or same organization, which would permit the security systems to promptly react to new threats by allowing a security system that has been subject to a new threat, and successfully addressed the threat, to provide information about the security functions or applications that were used.

For a modern security expert to develop a solution, the expert should be skilled in a number of complex security techniques including, for example, control of computing resources, advanced analytics systems, and different types of security products with no standard control "language." Additionally, such a security expert cannot realize a combination from security functions provided by different security systems and/or vendors. Typically, such functions are not programmable, and thus cannot be integrated with other functions. In addition, to define and create a new security function currently requires months of research and development. For evolving attacks and threats, these are not feasible solutions.

Existing solutions further face challenges when utilized by cyber security experts lacking knowledge of the particular manner in which an organization typically programs its cyber security applications. Specifically, experts may not be familiar with the idiosyncrasies of an entity's cyber security programs. As a result, modifying the behavior of existing cyber security systems requires that an outside expert either take significant time to gain familiarity with the existing cyber security applications used by the enterprise and/or rewrite new portions of the cyber security applications.

Further, existing solutions lack capability of easily managing security operations for complex cyber security systems. In particular, an enterprise network to be protected typically utilize a large number of networked devices, computers, servers, and other end-points, thereby increasing vulnerability to security threats. To protect such an enterprises different cyber security systems are typically utilized. As a result, the management, configuration and orchestrating the various systems in the organization is a complex task and typically requires months of programming work to accomplish. As a result current security systems configured to protect large scale enterprise networks are not easily adaptable to protect against ongoing security threats. For example, to change the mode of operation one resource or add a new resource to such security systems would require programming a new application. This means months of programming and deployment. Furthermore, currently there is no tool that displays all resources in the cyber security systems available for mitigating, investigating, or mitigating attacks or which available resources can be utilized to handle a specific threat. Therefore, the current security systems under-perform relatively to their full capabilities.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for programmably creating a security application via a graphical user interface (GUI). The method comprises causing a display of a service stage GUI window including at least one security phase zone; receiving, by the at least one security phase zone, a selection of at least one security service including at least one security decision engine (SDE); causing a display of an event rule stage window including at least one event rule parameters zone; and receiving, by the at least one event rule parameters zone, a selection of at least one event rule related to the at least one SDE; causing a display of an event relationship stage GUI window including at least one rule selection zone; receiving, by the rule selection zone, a selection of at least one workflow rule and at least one action, wherein the at least one workflow rule and the at least one action defines the event relationship as determined by the at least one event rule; and configuring the security application based on the selected at least one workflow rule and the selected at least one action.

The disclosed embodiments also include a system for programmably creating a security application via a graphical user interface (GUI). The system comprises a processing unit; and a memory, the memory containing instructions that, when executed by the processing unit, configure the system to: cause a display of a service stage GUI window including at least one security phase zone; receiving, by the at least one security phase zone, a selection of at least one security service including at least one security decision engine (SDE); cause a display of an event rule stage window including at least one event rule parameters zone; receive, by the at least one event rule parameters zone, a selection of at least one event rule related to the at least one SDE; cause a display of an event relationship stage GUI window including at least one rule selection zone; receive, by the rule selection zone, a selection of at least one workflow rule and at least one action, wherein the at least one workflow rule and the at least one action defines the event relationship as determined by the at least one event rule; and configure the security application based on the selected at least one workflow rule and the selected at least one action.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include systems utilizing graphical user interfaces and methods thereof. The disclosed embodiments are designed to configure cyber security systems to secure protected entities. A protected entity may include, for example, a L2/3 network element, a server application (e.g., Web, Mail, FTP, Voice and Video conferencing, database, ERP, and so on), "middle box" devices (e.g., firewalls, load balancers, NAT, proxies devices, etc.), SDN controllers (e.g., OpenFlow controllers and virtual overlay network controllers), and personal computing devices (e.g., PCs, laptops, tablet computers, smartphones, wearable computing devices, a smart TV, and other devices with internet connectivity (also known as IoT).

In some configurations, the protected entity may be deployed or otherwise accessed through various computing platforms. As noted above, computing platforms may include, but are not limited to, virtualized networks and software defined networks (SDN). The disclosed cyber security system is configured to detect and mitigate multi-vector attack campaigns that carry advanced persistent threat (APT) attacks, web injections attacks, phishing related threats, misuse of applications and server resources, denial-of-service (DoS) and distributed DoS (DDoS) attacks, business logic attacks, violations of access policy, and so on. The APTs include, but are not limited to, malware command and control, and malware spreading. The business logic type of attacks include, but are not limited to, network intelligence gathering such as network scans, application scans, and web scraping types of attacks.

Figure 1:
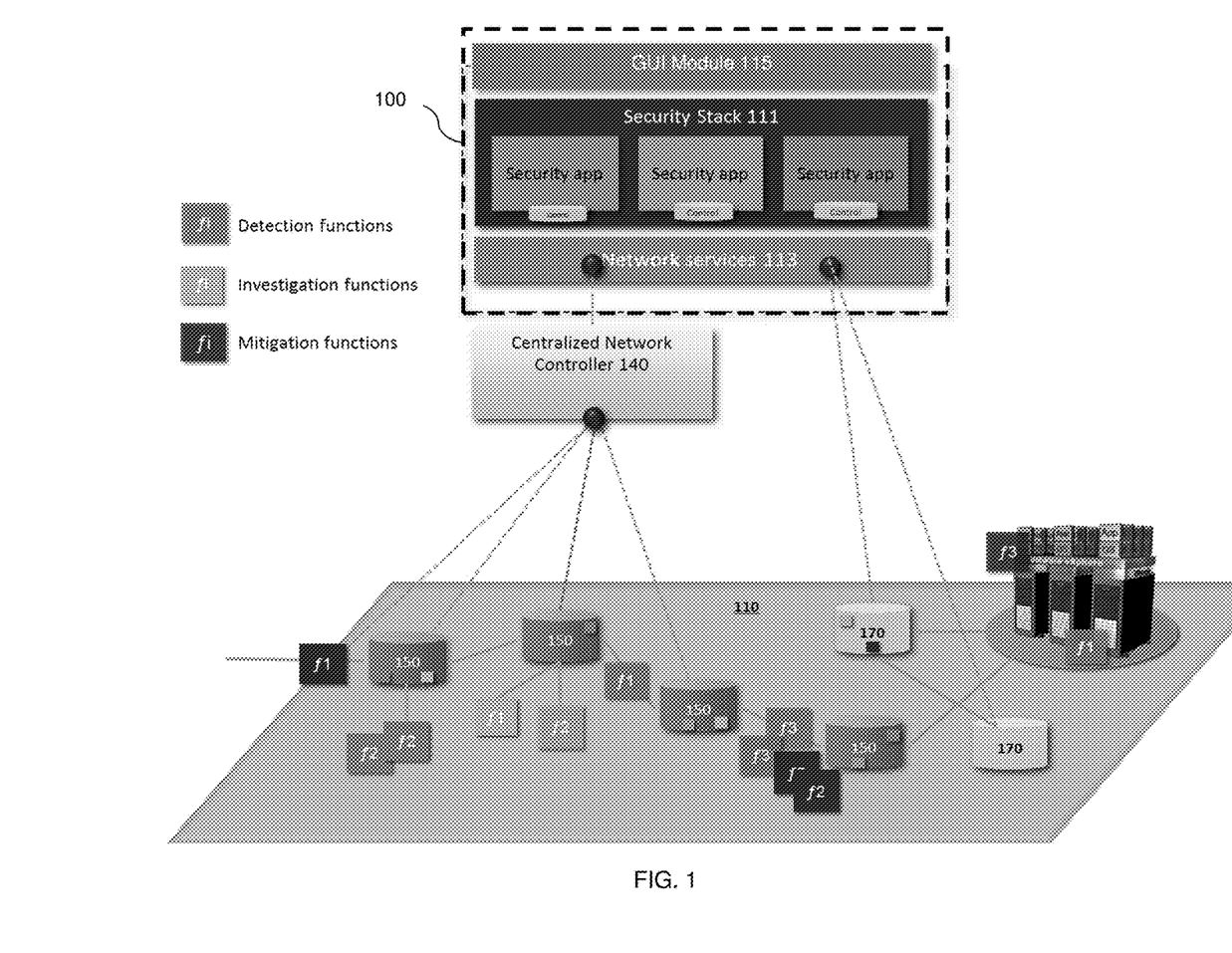
FIG. 1 is a diagram of a cyber-security system utilized to describe the various disclosed embodiments.

FIG. 1 is an exemplary and non-limiting diagram of a cyber-security system 100 utilized to describe the various embodiments. The cyber-security system 100 is configured to protect an entity (hereinafter a "protected entity") 130 communicatively connected in a network 110. The cyber security system 100 is also connected to the network 110. The network 110 may be, but is not limited to, a virtualized network, a software defined network (SDN), a hybrid network, a cloud services networks, or any combination thereof.

An SDN can be implemented in wide area networks (WANs), local area networks (LANs), the Internet, metropolitan area networks (MANs), ISP backbones, datacenters, and the like. Each network element in the SDN may be a router, a switch, a bridge, a load balancer, a DPI device, and so on, as well as any virtual instantiations thereof. Typically, elements of the SDN include a central SDN controller 140 and a plurality of network elements 150. In certain implementations, the central SDN controller 140 communicates with the network elements 150 using an OpenFlow protocol which provides a network abstraction layer for such communication; a Netconf protocol which provides mechanisms to install, manipulate, and delete the configuration of network devices; and so on. In an exemplary configuration, the network 110 may be a hybrid network in which a SDN is a sub-network of a conventional network in which its elements cannot be programmed by a central SDN controller.

In one embodiment, the security system 100 interfaces with the network 110 through the central SDN controller 140. In another embodiment, the functionality of the cyber-security system 100 can be integrated in the central SDN controller 140. Alternatively, the functionality of the cyber-security system 100 operates directly with the network elements in the data-plane (or it can be a mix of the above). This allows implementing security functions in various locations in the network 100 (SDN, Legacy (non-SDN) networks, or hybrid networks) to protect the protected entity 130.

In an embodiment, security functions are programmed by the cyber-security system 100 to perform detection, investigation, and mitigation functions (labeled as f1, f2, and f3, respectively, in FIG. 1). The functions are executed during different phases of the operation of the cyber-security system 100, i.e., detection, investigation, and mitigation phases and independently programmed by the cyber-security system 100. It should be noted that some or all the functions (f1, f2, and f3) can be implemented or otherwise performed in the network 110.

In an exemplary implementation, the cyber-security system 100 includes a security stack module 111, a network interface module 113, and a graphical user interface (GUI) module 115. The security stack module 111 is configured to control and execute the various phases to protect the protected entity 130. Specifically, the security stack module 111 is configured to create, control, program, and execute the security functions (f1, f2, and f3) through a plurality of security applications or "apps." The operation of the security stack module 111 is discussed in greater detail herein below with respect to FIG. 2.

The network interface module 113 provides an interface layer of the cyber-security system 100 with the central SDN controller 140 to allow commutation with SDN-based network elements 150. In another embodiment, the network interface module 113 also communicates with "legacy" network elements 170 in the network 110. Non limiting examples for communication drivers that allow for configuration, control, and monitoring of legacy network elements include, but are not limited to, border gateway protocol, (BGP) flow specifications, NetConf, command line interfaces (CLIs), NetFlow, middle-box devices drivers (e.g., L4-L7 drivers, DPI device drivers), end point device drivers (mobile, host based security applications), server applications, and so on.

According to the disclosed embodiments, the GUI module 115 provides a GUI for receiving customization parameters from a user of the cyber security system 100. The customization parameters are utilized to create or customize a security application and may include, but are not limited to, security phases, security services, and security decision engines (SDEs) to be utilized; workflow and/or correlation rules; and actions to be taken upon satisfaction of one or more of the workflow and/or correlation rules. The GUI module 115 may further provide one or more windows displaying different options at different stages of customization. In an embodiment, each window may further include zones including icons representing customization parameters. Based on customization parameters received from the user, one or more security applications in the security stack 111 may be customized or created. Operation of the GUI module 115 in creating a new security application is described further herein below with respect to FIG. 3.

A security application created using the GUI allows for management, control and/or orchestration of the various security elements deployed to protect the entities in an enterprise's network. The GUI 115 generates a code (e.g., Java code) corresponding to the services, SDEs and rules selected or otherwise configured through the GUI 115. The GUI generated code is translated, by the security stack 111, into a set of instructions compatible with the various elements taking part in the detection, investigation, and/or mitigation phases. Such instructions are communicate thorough the respective drivers of the various network elements (e.g., elements 150 and 170).

Figure 2:
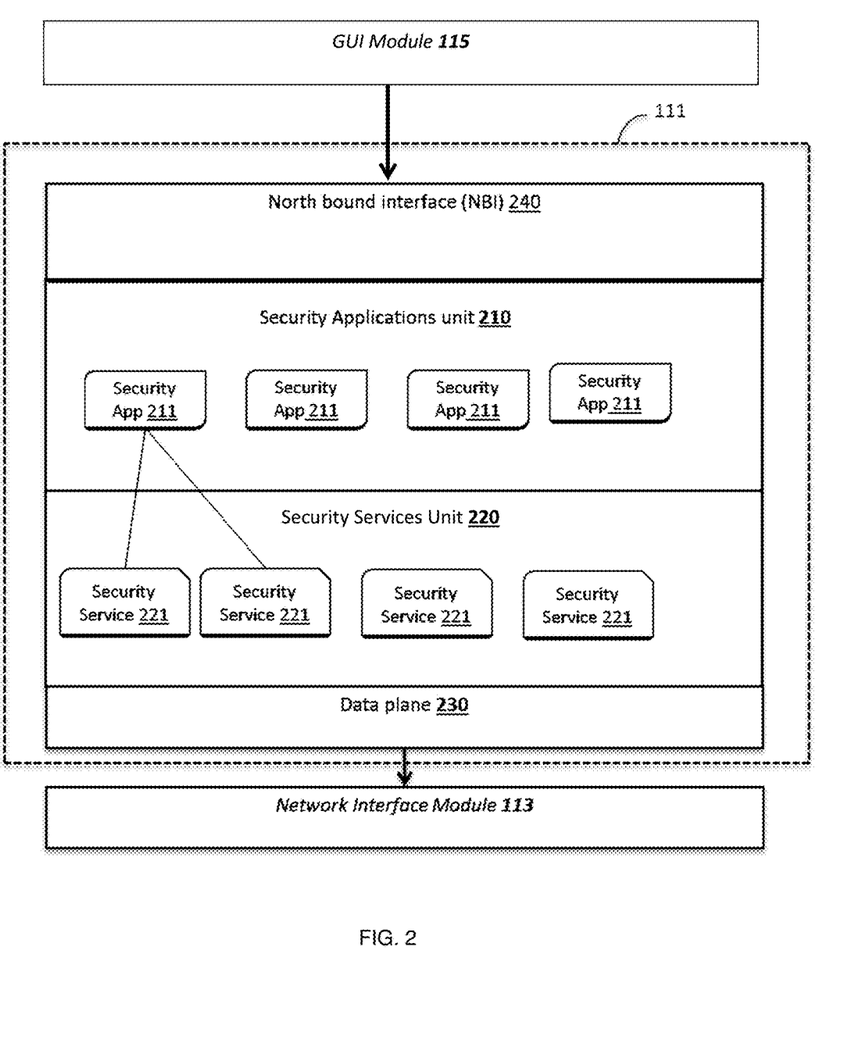
FIG. 2 is a block diagram of a security stack module implemented utilized to describe the disclosed embodiments.

FIG. 2 shows an exemplary and non-limiting block diagram of the security stack module 111 implemented according to one embodiment. In an exemplary implementation, the security stack module 111 includes the following units: a security application unit 210, a security services unit 220, a data-plane unit 230, and a northbound network interface (NBI) 240. The security stack module 111 includes security services 221 that are reusable across different security applications 211. Thus, different security applications 211 (each one for different purpose) can consume the same security services 221 for their own needs.

Specifically, the security application unit 210 includes the security applications (apps) 211. Each security application 211 represents a different type of security protection or function including, for example, APT detection and mitigation, low and slow attacks protection, reputation security intelligence, web page scraping detection, mitigation, phishing related attacks, infected hosts discovery, and so on. The modules or functions interfacing with a security application provide the required services allowing the creation or otherwise updating of a security application according to evolving security needs.

In an embodiment, the security application unit 210 is preconfigured with a set of security applications 211. Additional security applications 211 can be added and removed from the security application unit 210 as needed. In an embodiment, all security applications 211 hosted in the security application unit 210 implement pre-defined APIs in order to efficiently communicate with the security services 221. In an embodiment, the preconfigured security applications 211 may be modified based on inputs received via the GUI module 115. In another embodiment, one or more of the security applications 211 may be generated based on the inputs received via the GUI module 115. Creation of security applications is described further in the above-reference U.S. patent application Ser. No. 14/716,359, which is hereby incorporated by reference.

The security services unit 220 includes different types of security services 221. Each security service is designed to host multiple SDEs and to serve one or more security applications 211. The security services 221 are also designed to provide efficient control over security functions (f1, f2, and f3) in the network data-plane.

Each security service 221 includes programmable security decision engines (SDEs). The system 100 can use a set of pre-defined SDEs, import engines, and/or create a new SDE and share (export) a SDE. The creation and modification of SDE is further described in co-pending applications Ser. No. 14/716,359, assigned to the common assignee and is hereby incorporated by reference. The GUI 115 provides as description of each SDE and any intuitive way to configure security event rules for each SDE. The SDEs, and therefore the security services, can allow the cyber-security system 100 to adapt to new threats, new attack behaviors, unknown behaviors, or attacks that utilize new evasion techniques.

According to some exemplary embodiments, security services 221 that may be maintained and executed by the security services unit 220 may provide, but are not limited to, anomaly detection of network activities toward the network elements, anomaly detection of network activities toward the server applications, detection of users' anomalous activities, management and analysis of reputation sources, sandbox resources, AV resources, DLP resources, IPS and IDS resources, advanced challenge response actions, and real-time generation of attack-risk chain patterns. The security services 221 utilized by the security services unit 220 are described further in the above-referenced U.S. patent application Ser. No. 14/615,020, assigned to the common assignee and is hereby incorporated by reference.

It should be noted that programmability of the security stack module 111, as enabled by the architecture of the system 100, allows a user to select different types of security services via the GUI module 115, thereby providing a mix and match capability. Specifically, this capability is achieved by the data plane unit 230 and a network interface module 113 which provides an abstraction layer for all underlining data-plane functions in the network (such as routers, switches, DPI devices, sandbox servers, IPS devices, DLP devices, AV servers, WAF devices, end-point anti-malware software, challenge-response servers, and so on).

Information that is needed for operation of the security services 221 may be retrieved from the data-plane unit 230 and/or from the north bound interface 240. It should be noted that the security services in the unit 220 also communicate and interface with the security applications unit 210 (the security applications unit 210 controls and manages the security services 221 in the security services unit 220).

It should be further noted that the security services listed above are merely examples and other services can be utilized in the cyber-security system 100 according to the embodiments disclosed herein. In various non-limiting embodiments, a programming language is provided in order to allow users to create and modify security applications and to configure or set event rules of SDE(s) contained in each security service, as per business/threat needs.

The data-plane unit 230 provides central management of the data-plane resources such as routers, switches, middle-box devices, and so on. In an embodiment, the data plane unit 230 allows the security services to retrieve and store the required network and application information from the data plane resources as well as to enforce security network control actions. Various functions provided by the data plane unit 230 include topology discovery, traffic monitoring, data collection, traffic redirection, traffic distribution (L2, L3 load balancing for scaling out resources), traffic copy, and so on.

Topology discovery involves interacting with the data-plane network elements, SDN controllers, and orchestration systems in order to retrieve network topology information. This function is important for the topology awareness that is needed by other data-plane's functions as well as security services and applications.

The redirection and scale functions are designed to manage all network traffic redirection functions which include, but are not limited to, traffic redirection, smart traffic copying, traffic distribution, and so on.

The data collection may involve collecting statistics data and security events logs from the probes and storing such event logs and statistics data. Statistics collection may include, but is not limited to, network-based statistics from network elements; application-based network statistics from DPI resources (including middle-boxes and servers); and user-based statistics from network, DPI, middle boxes, and end-point resources. Security events logs may include logs of IPS, AV, sandbox security events, and so on. The collector service normalizes the security events and statistical information into a format that can be analyzed by the security services 221 in the security services unit 220.

The data-plane unit 230 further provides the following functions: management of quality of service (QoS) actions in the network elements, and a set of mitigation functions. The mitigation functions include basic access control list (ACL) services, which are layer-2 to layer-4 access control list services that manage the distributed rules throughout the network elements. Software defined networks, as well as legacy network elements and hybrid networks, may be supported by this service.

Advanced ACL functions possess similar characteristics to basic ACL functions, but can define more granular access rules including application parameters (L7). Specifically, an ACL function can use the generated RT fingerprints from a real-time fingerprint generation service (discussed before) as a blocking rule. The ACL function typically operates with DPI network elements for enforcing the application level ACL rules. Service rate-limits manage the QoS rules in the data plane device. Black-hole route function provides an extension of the redirection data-plane services that manage redirection of users into a black-hole. Typically, black holes are network locations where incoming or outgoing traffic is silently discarded (or "dropped"), without informing the source that the data did not reach its intended recipient).

In an embodiment, the data-plane services allow both real-time detection and "near" real-time detection. Real-time detection of attacks is facilitated by feeding the statistics directly from the data-plane collectors, in real-time, to the security services unit 220 without storing the raw statistics to allow fast analysis of the decision taking. In general, the data-plane unit 230 provides all raw information that is required by the security services 221 and controls the network via decisions made by the security services 221 and security applications 211.

In some exemplary implementations, certain functions provided by the data-plane unit 230 can be implemented in the central SDN controller 140. Examples for such functions may include, but are not limited to, redirection, monitoring, and data collection.

The north bound interface 240 interfaces between the security stack module 111 and one or more external systems (not shown). The external systems may include, for example, third party security analytics systems, security intelligence feeds, security portals, datacenter orchestration control systems, identity management systems, or any other system that can provide information to the security stack module 111. This enables a wider context-based security decision making processes. In an embodiment, the interfaces 240 may include standard interfaces, such as CLI, REST APIs, Web user interface, as well as drivers that are already programmed for control, configuration and/or monitoring of specific third party systems, and so on. The north bound interface 240 also interfaces with network interface module 113.

In an exemplary and non-limiting embodiment, the security services 221 may include, but are not limited to, a network anomaly security service 221-1, a user application anomaly security service 221-2, a sandbox security service 221-3, a reputation security service 221-4, a user identity security service 221-5, attack signatures security service 221-6, a challenge-response security service 221-7, a real-time risk-chain pattern generation security service 221-8, an anti-virus (AV) security service 221-9, and a Web application (WAF) security service 222-10. The security services 221 of this exemplary embodiment are described further in the above-referenced U.S. patent application Ser. No. 14/615,020, which is hereby incorporated by reference.

The various security services 221 output security signals to the security applications 211. Such security signals maybe generated in response to, but not limited to, detection of malware activity, protocol usage anomaly, a drop of point behavior, a network scan behavior, and so on.

It should be noted that the security services 221 listed above are merely examples and other services can be utilized in the system 100 according to the embodiments disclosed herein. In various embodiments, a GUI 115 is provided in order to allow users to create and modify security applications and to modify the SDEs contained in each security service 221, on a case-by-case basis.

It should be noted that modules in the cyber-security system 100 and the units 210, 220, and 230 in the security stack module 111 are independent. Thus, any changes in one unit or module do not necessarily result in any changes to the other modules.

According to an embodiment, the cyber-security system 100 is designed to activate/deactivate, and correlate between the security applications 211 in the unit 210 and security services in the unit 220, in order to define, create, or otherwise program a robust solution for detecting and mitigating attacks against the protected entity. The sequence for activating, deactivating, and correlating the various functions and modules of the cyber-security system 100, is based on one or more correlation and/or workflow rules. In an embodiment, the detection, investigation and/or mitigation functions are performed in the system 100 based on at least one correlation and/or workflow rule defined to handle a certain threat.

At a top level, the correlation model allows each security application to correlate feeds received from other security applications, thereby making the entire security decision-making process more holistic and context-based, i.e., correlating decision outputs from different security application types before making a final security decision.

To this end, each security application 211 may communicate with other security applications and services by means of a controller managing the correlation of the different feeds.

At a lower level, the correlation of feeds occurs between multiple security services. This allows a single security application to make decisions based on multiple services in order to increase the overall decision accuracy.

According to one embodiment, the correlation of various feeds is performed by a set of workflow (or correlation) rules which are processed and applied by a controller of a security application. In an embodiment, the set of workflow and/or correlation rules are defined by the user via the GUI module 115. The workflow and/or correlation rules are set respective of the attacks that the cyber-security system 100 can handle. That is, in an exemplary implementation, a set of workflow rules may be defined for each different type of threat.

Each, some, or all of the modules of the cyber-security system 100 and the various units of the security stack module 111 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 3:
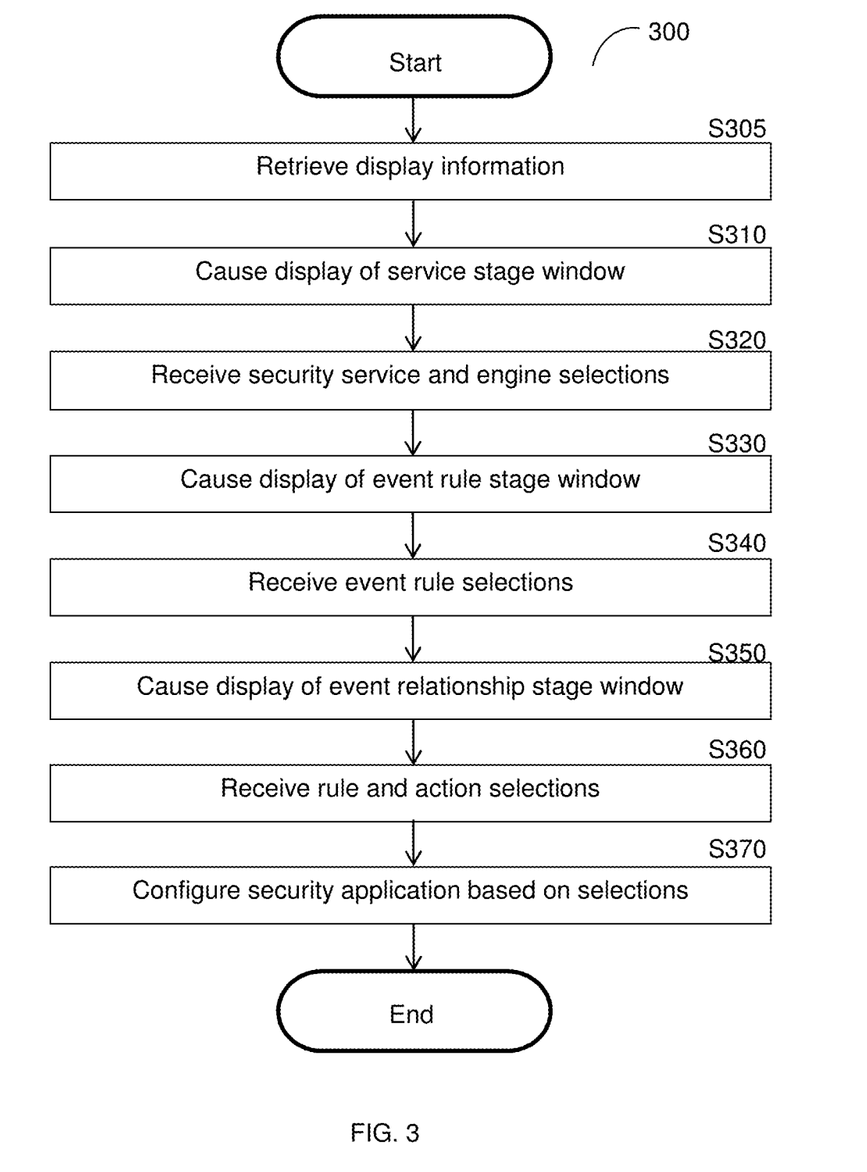
FIG. 3 is a flowchart illustrating a method for customizing a security application via a graphical user interface according to an embodiment.

FIG. 3 is an exemplary and non-limiting flowchart 300 illustrating a method for programmably creating or customizing a security application using a GUI according to an embodiment. In an embodiment, the GUI may be displayed and user inputs may be received using a GUI module (e.g., the GUI module 150).

At S305, information to be displayed via the GUI is retrieved. Such information may include, but is not limited to, predetermined security services, SDEs, event rules, workflow rules, correlation rules, GUI window templates, icons, zones, and so on. In an embodiment, a display of all security services, SDEs, event rules, workflow rules, and correlation rules may be caused. In an embodiment, the display of retrieved information may be caused in response to a user input.

At S310, a display of a service stage window is caused. In an embodiment, the service stage window includes one or more security phase zones. Each security phase zone is associated with a predetermined security phase or a user defined phase, and is configured to receive user selections of security services and/or SDEs to be executed during the respective security phase.

At S320, user selections of security services and/or SDEs to be utilized are received. The selection may be received via, e.g., dragging and dropping of one or more icons into the security phase zones. Each icon may represent a security service or a SDE. In an embodiment, upon selection of service, a service selection zone for receiving SDEs respective of the security service may be caused to be displayed.

Figure 4:
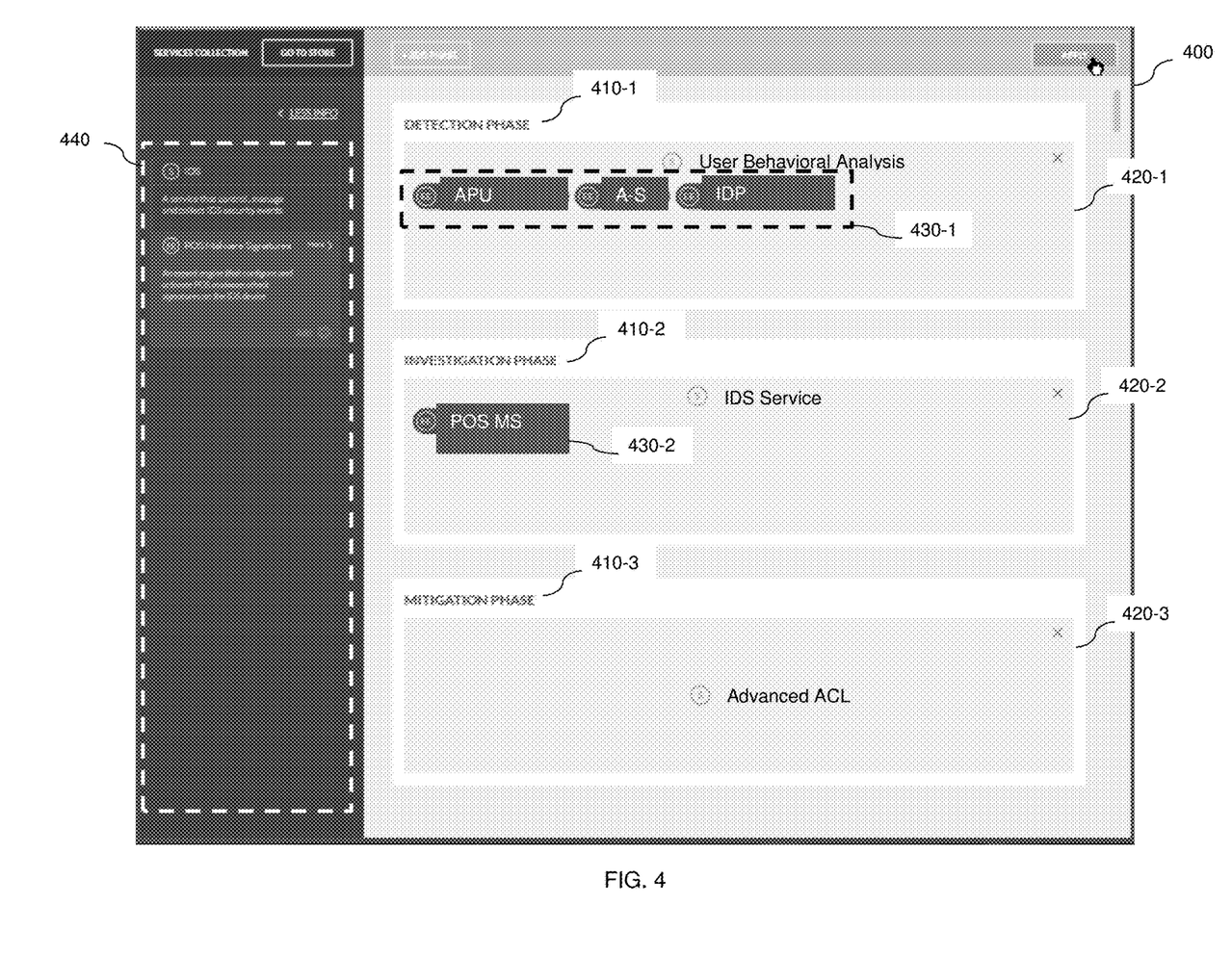
FIG. 4 is an exemplary screenshot illustrating a service stage window assigning security services and security decision engines (SDEs) to security phases according to an embodiment.

Referring now to FIG. 4. An exemplary and non-limiting screenshot illustrating a service stage window 400 including security phase zones as well as selected security services and SDEs is seen in FIG. 4. The service stage window 400 includes security phase zones 410-1, 410-2, and 410-3 and respective security service selection zones 420-1, 420-2, and 420-3; SDEs icons 430-1 and 430-2; and a services collection zone 440. The security phase zones 410-1, 410-2, and 410-3 represent detection, investigation, and mitigation phases, respectively. In this exemplary embodiment, a user may select security services from the services collection zone 440 by dragging and dropping the selection in one of the security phase zones 410. In various embodiments, the services collection zone 440 includes security services and/or SDEs that the user may select.

Upon selection of a security service, the security service may be displayed within its respective security phase zone 410 as a security services selection zone 420. The user may further select SDEs from the services collection zone 440 by dragging and dropping the selection into one of the security services selection zones 420. Upon selection of a SDE, the SDE may be displayed as one of the security engine icons 430. In an embodiment, if one or more of the security phase zones 410 does not contain any security SDE icons, the respective security phases and/or security services may not be utilized by the customized application.

In certain embodiments, the information in the zone 440 can be pre-populated respective of the security phase and/or security services selected by the user.

In the exemplary screenshot shown in FIG. 4, a user has selected security services related to user behavioral analysis service, intrusion detection system (IDS) service, and advanced access control lists (ACL) service. The user behavioral analysis service utilizes machine learning and monitors user traffic flows statistics to identify anomalous user activities based on the learned user patterns. The IDS service controls IDS devices in the network. It provisions attack signature policies according to the selected IDS SDEs and monitors the associated IDS security event logs to identify intrusion activities. The advanced ACL service allows placement of ACLs throughout a network according to a detected threat and allows for monitoring blocked traffic statistics respective of permissions defined in the placed ACLs.

Further, in the exemplary screenshot shown in FIG. 4, the user has selected SDEs associated with the user behavioral analysis service that are related to abnormal protocol usage (APU), anti-scan (A-S), and internal drop point (IDP) to be utilized by the user behavioral analysis service and a SDE related to point of sale malware signatures (POS MS) to be utilized by the IDS service. The APU SDE identifies abnormal protocol usage based on topology and/or user traffic anomalies. The A-S SDE detects pre-attack probes on the network. The IDP SDE analyzes user group behavior based on topology and traffic anomalies in order to identify information drop behavior. The POS MS SDE configures and activates POS malware attack signatures on the IDS devices in order to identify known traffic patterns generated by POS malware.

At S330, a display of an event rule stage window is caused or otherwise trigged. In an embodiment, the event rule stage window includes one or more event rule zones. Based on user interactions with the event rules stage window, at S340, selections of one or more sets of event rule parameters are received. Each selection may be received via, e.g., dragging and dropping of an icon. Each set of event rule parameters corresponds to a SDE and may include, but is not limited to, one or more values, locations, specifications, logical operators, and/or events. If a set of event rule parameters for a SDE is satisfied based on information determined by the SDE, then an event is generated based on the satisfied set of event rule parameters. In an embodiment, a default set of event rule parameters may be displayed for each SDE. In a further embodiment, the user may modify the default set of event rule parameters and/or add sets of event rule parameters.

Figure 5:
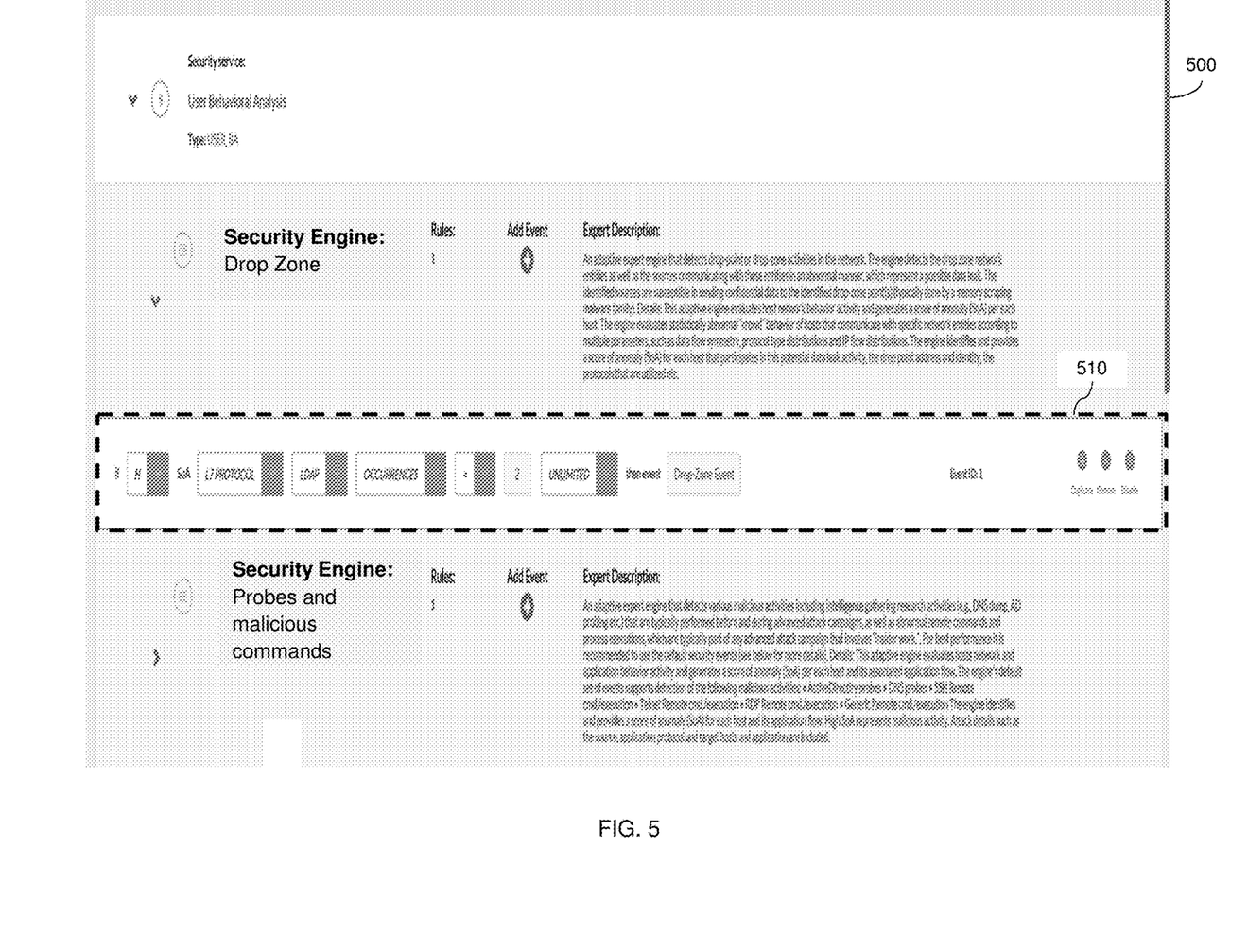
FIG. 5 is an exemplary screenshot illustrating an event rule stage window for receiving selections of event rules parameters.

An exemplary and non-limiting screenshot of an event rule stage window 500 for receiving selections of event rule parameters is seen in FIG. 5. The event rule stage window 500 includes an event rule parameters zone 510. In the exemplary screenshot shown in FIG. 5, the event rule parameters zone 510 includes drop down boxes for selecting event rule parameters. If the condition defined by the selected event rule parameters are met, then the selection zone SDE generates a security event. It should be noted that a single set of event rule parameter selections is shown in FIG. 5 merely for simplicity purposes and without limitation on the disclosed embodiments. Additional sets of event rule parameters may be selected by the user.

Returning to FIG. 3, at S350, a display of an event relationship stage window is caused or otherwise trigged. In an embodiment, the event relationship stage window includes one or more rule selection zones. Each rule selection zone is associated with a one or more workflow and/or correlation rules. The workflow and correlation rules may include, but are not limited to, event rules to be satisfied, logical operators defining required relationships between event rules, actions to take upon satisfaction of the rules, and so on. Each rule selection zone is configured to receive user selections of workflow and/or correlation rules to be utilized in determining which actions the security application should take in response to potential security threats.

A workflow rule defines relationships between the security phases, while a correlation rule defines relationships between SDEs being executed in each phase.

At S360, selections of at least one rule and at least one corresponding action is received. Each selection may be received via, e.g., dragging and dropping of an icon. In an embodiment, S360 may further include receiving selections of logical operator icons for defining workflow and/or correlation rules. The selection may include, but is not limited to, dragging and dropping such icon or icons into the rule selection zones. The icons may collectively define workflow and/or correlation rules among events. During execution, the workflow or correlation rules are utilized to determine which actions to take.

Figure 6:
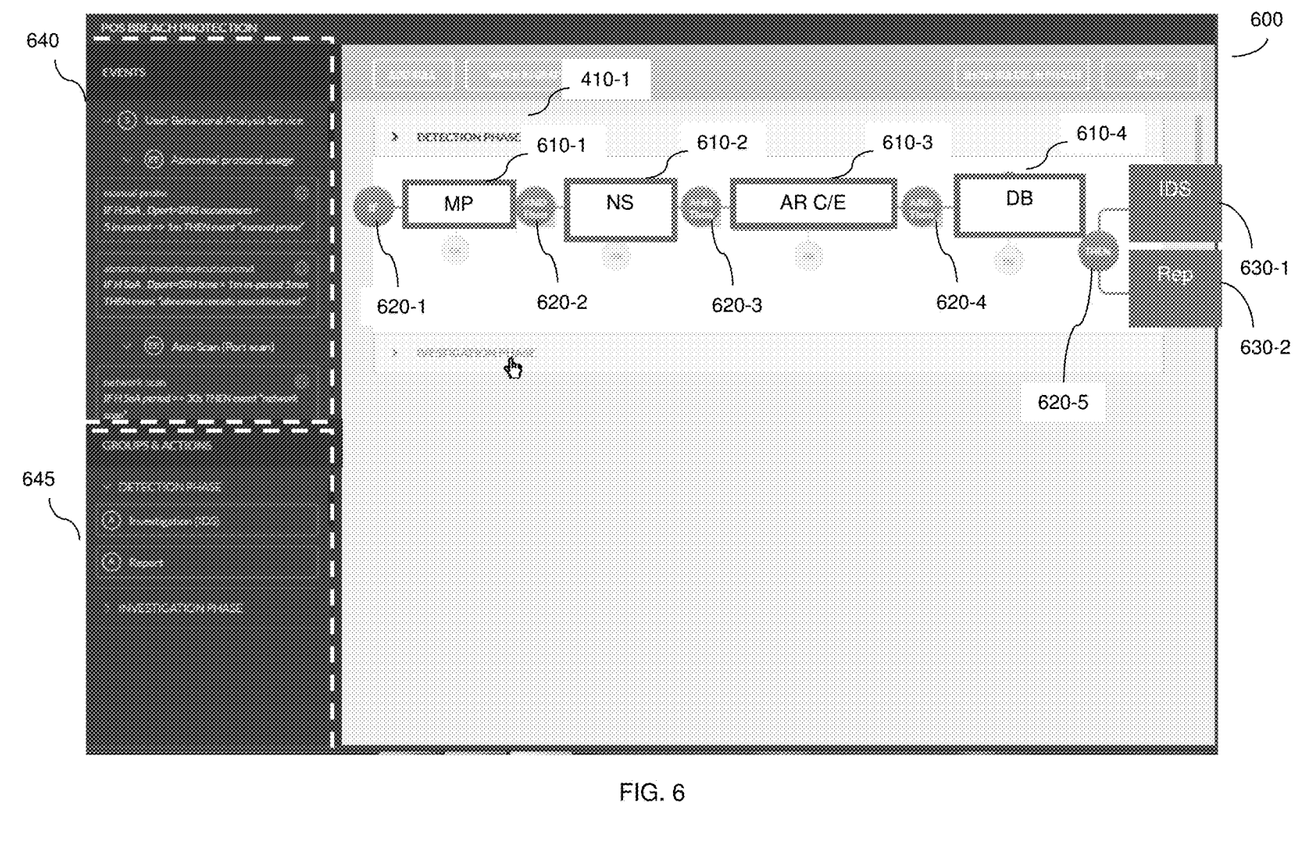
FIG. 6 is an exemplary screenshot illustrating an event relationship stage window for setting correlation rules and/or workflow rules according to an embodiment.

An exemplary and non-limiting screenshot of an event relationship stage window 600 illustrating definitions of workflow and/or correlation rules for a security phase is seen in FIG. 6. The event relationship stage window 600 includes event icons 610-1 through 610-4, logical operator icons 620-1 through 620-5, action icons 630-1 and 630-2, an events zone 640, and a groups and/or actions zone 645. Each of the event icons 610 is associated with an SDE having event rules. Each workflow or correlation rule may be determined based on correlation and/or satisfaction of an event rule as applied to, but not limited to, a signal value, a duration, a frequency, and so on. The event rules may be satisfied based on, e.g., signals generated by the selected security service(s). Satisfaction of workflow and correlation rules based on event rules is described further in the above-referenced U.S. patent application Ser. No. 14/615,020, which is hereby incorporated by reference.

Each of the logical operator icons 620 defines a relationship among the selected SDEs and their generated events. In an embodiment, the security application is configured such that, if all rules defined in the event relationship stage window 600 are satisfied, actions defined by the action icons 630 are taken. An action can be, but is not limited to, creating a group event (which represents a correlation of events) that can be later used as an event which can be correlated with other events in another correlation rule. In an embodiment, when a group event is created based on an action, the group event may subsequently appear as a group event icon in the groups and/or actions zone 645. Such appearance may facilitate application of the same group event to more than one rule within a phase.

A user may define workflow and/or correlation rules using icons in the events zone 640 by dragging and dropping the icons into a security phase zone 410 (e.g., the detection security phase zone 410-1). The events zone 640 may include, but is not limited to, SDE and/or events icons 610, logical operator icons 620, and/or action icons 630. In an embodiment, the events zone 640 may be populated with security service, SDEs and/or event rules selected via the windows 400 and/or 500.

A user may also define actions using icons in the groups and/or actions zone 645 by dragging and dropping the icons into the security phase zone 410. The groups and/or actions zone 645 may include, but is not limited to, action icons 630, group event icons (described herein below with respect to FIG. 8), information actions such as reports, and so on.

In the exemplary screenshot shown in FIG. 6, a user has selected event rules associated with the event icons 610-1 through 610-4. The icons represent event rules for detecting events based on security signals generated by the selected security services as described further herein above with respect to FIG. 2. Additionally, the user has selected logical operators corresponding to logical operator icons 620-1 through 620-5, respectively, as well as action icons 630. The action icon 630 as shown in FIG. 6 corresponds to beginning an investigation phase.

Figure 8:
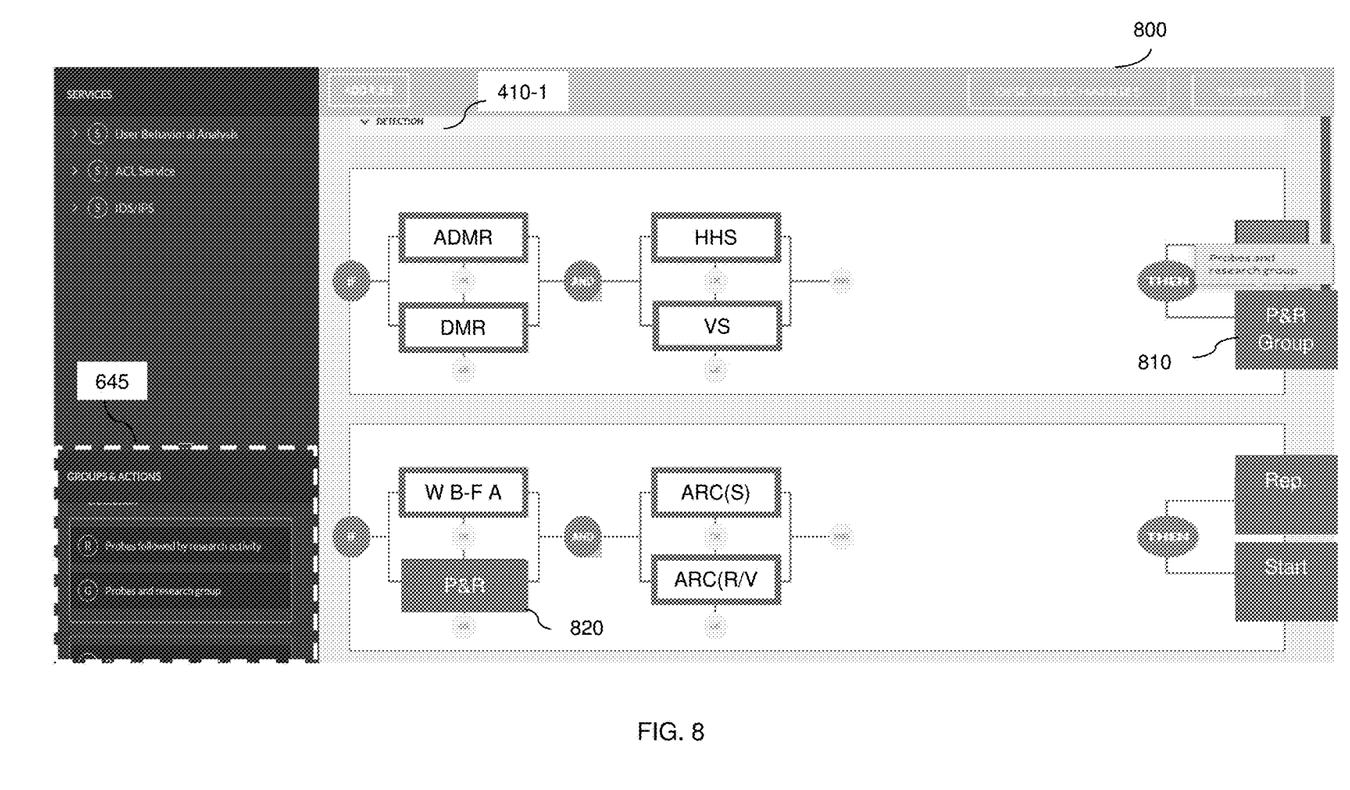
FIG. 8 is an exemplary screenshot illustrating creation and use of a group event according to an embodiment.

FIG. 8 shows an exemplary and non-limiting screenshot 800 illustrating creation and use of a group event according to an embodiment. The screenshot 800 notably includes an action icon 810, the groups and/or actions zone 645, and a group event icon 820. The action icon 810 defines a group of events relating to probes and to research activity, respectively. Upon placement of the action icon 810, a corresponding group event is generated and displayed in the groups and/or actions zone 645. A user of the GUI can subsequently add the group event to a workflow by, e.g., dragging and dropping the group event icon 820 from the groups and/or actions zone 645 into a same phase (e.g., the detection phase 410-1).

Returning to FIG. 6, upon satisfaction of the workflow and correlation rules defined in the event relationship stage window 600, a security application may be configured to execute the IDS service in an investigation phase. Specifically, the IDS service is executed only if the event rules associated with the MP icon, the NS icon, the AR C/E icon, and the DB icon, respectively, are satisfied in sequential order. Thus, during execution of a security application configured according to the event relationship stage window 600, upon satisfaction of the MP event rule, it is determined whether the NS event rule is satisfied. If so, it is checked whether the AR C/E event rule is satisfied and, if so, whether the DB event rule is satisfied. If all of the event rules have been met in the proper sequential order, the IDS security service is executed.

Returning to FIG. 3, at S370, a security application is configured based on the received selections. The security application may be an existing application, or may be generated upon receiving the selections. The security application is configured to utilize the selected security services and SDEs to perform actions in response to satisfaction of one or more event rules. The actions may include, but are not limited to, executing a security phase, executing a security service, executing a SDE, reporting information related to a potential security threat (e.g., a risk level), ceasing execution of a security service or a SDE, creating a group event, terminating or resetting the application operation, and so on. The actions may be performed according to a workflow as defined by the workflow and/or correlation rules.

In an embodiment, the configuration may include, but is not limited to, determining graphical code based on inputs received via any of the windows. The graphical code represents the selections of SDEs, security services, and/or event rules. Code in a predetermined programming language is determined based on the predetermined graphical code. Based on the programming code, one or more policies may be set. The policies include, but are not limited to, the selected event rules, workflow rules, and/or correlation rules. During execution of the security application, the policies are enforced via the selected SDEs.

Figure 7:
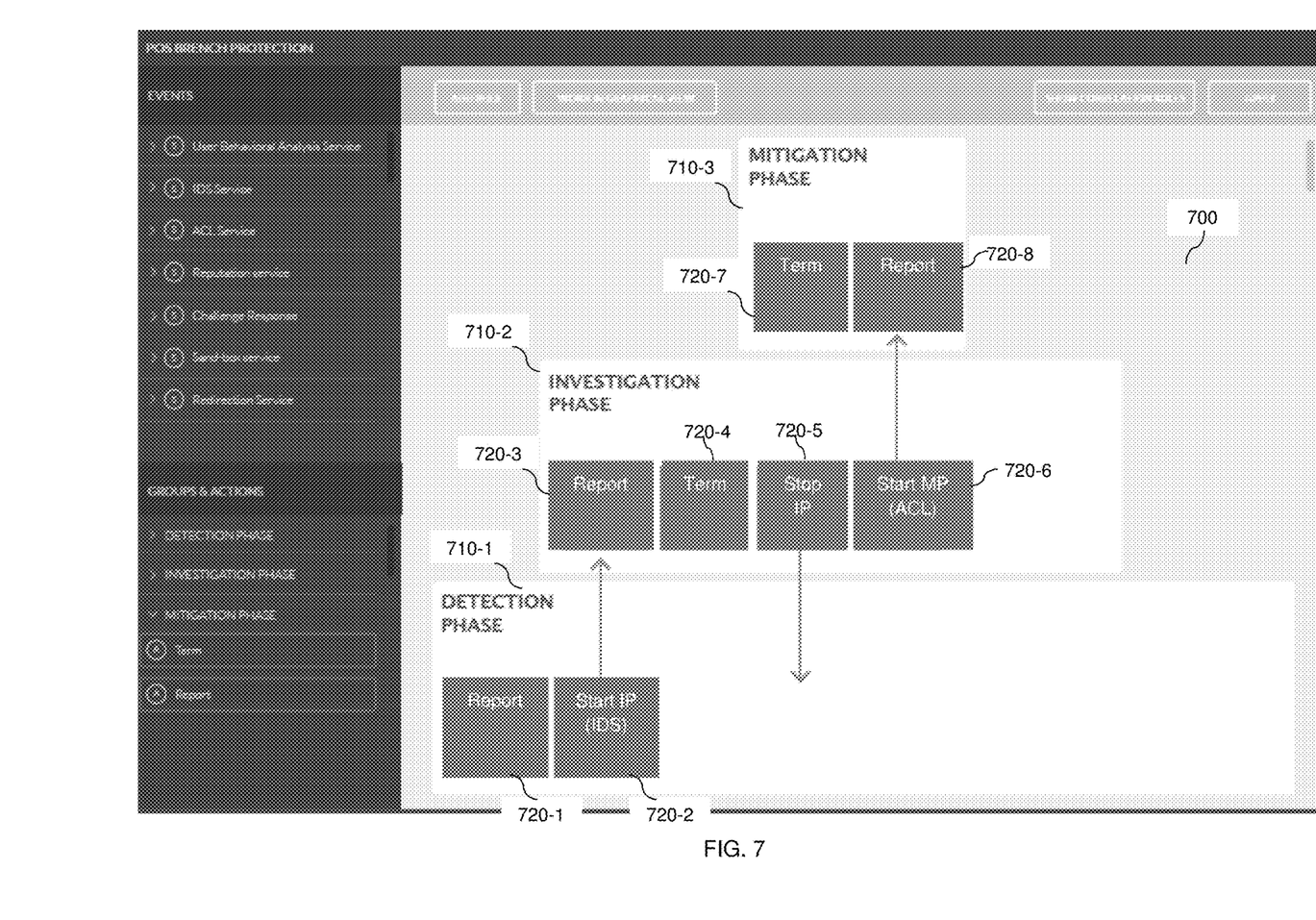
FIG. 7 is an exemplary screenshot illustrating a graphical depiction of a workflow summary defined by one or more workflow and/or correlation rules.

An exemplary and non-limiting screenshot illustrating a graphical depiction 700 of a workflow of actions defined by workflow rule and/or correlation rule is seen in FIG. 7. The graphical depiction 700 includes security phase zones 710, action icons 720. The security phase zones 710-1, 710-2, and 710-3 representing a detection phase, an investigation phase, and a mitigation phase, respectively. Each of the action icons 720 represents an action to be taken upon satisfaction of one or more correlation rules. In the exemplary screenshot shown in FIG. 7, such actions include generating a report; executing a security service and/or engine of a security phase; ceasing execution of a security phase, service, and/or engine; and terminating or resetting the application operation (i.e., restarting it).

The graphical depiction 700 demonstrates the relationships between security phases and the actions each phase is programmed to execute. A user may further edit the workflow and correlation rules of the security application by drilling down from the phases area or from the actions area. Upon drilling down, the associated correlation rules are displayed (such as, e.g., the event relationship stage window 600). The example in FIG. 7 shows a summary of the following security application workflow: the start investigation phase (IP) action icon 720-2 represents beginning execution of an IDS security service in the investigation phase, the stop IP action icon 720-5 represents ceasing execution of the investigation phase (thereby returning to the detection phase), and the start mitigation phase (MP) action icon 720-6 represents beginning execution of an ACL security service in the mitigation phase.

The graphical depiction 700 may be used for debugging of the operation of the security application, the selected security services, SDEs, and policies (including any event rules as well as workflow rules and/or correlation rules between event rules). In an embodiment, a user may switch from the graphical representation 700 to a window (e.g., one of the windows 400, 500, or 600) to further modify the selections.

It should be noted that the screenshots shown in FIGS. 4-8 are merely exemplary and do not limit any of the disclosed embodiments. Different numbers and types of zones, icons, and/or logical operators may be utilized without departing from the scope of the disclosure. Additionally, the windows 400, 500, and 600, the graphical depiction 700, and the screenshot 800 are not limited to the specific appearance disclosed or shown herein. Windows featuring different appearances may be utilized without departing from the scope of the disclosed embodiments. Further, zones may contain more or fewer icons to be dragged and dropped.

A security application created using the GUI, as discussed herein above, allows to manage, control and/or orchestrate the various security elements deployed to protect the entities in an enterprise's network. The GUI generates a code (e.g., Java code) corresponding to the services, SDEs and rules define through the GUI. The GUI generated code is translated, by the security stack, into a set of instructions compatible with the various elements taking part in the detection, investigation, and/or mitigation phases. Such instructions are communicate thorough the respective drivers of the various network elements configured to execute the detection, investigation, and/or mitigation phases.

It should also be noted that the steps of the method 300 are shown in a specific order merely for simplicity purposes and without limitation on the disclosed embodiments. The security application may be programmably configured via the GUI in different sequences without departing from the scope of the disclosure. Any or all of the steps of the method 300 may be repeated, preferably in response to user inputs indicating a desire to revisit one or more of the steps.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for programmably creating a security application via a graphical user interface (GUI), comprising:
   causing a display of a service stage GUI window including at least one security phase zone;
   receiving, by the at least one security phase zone, a selection of at least one security service including at least one security decision engine (SDE);
   causing a display of an event rule stage window including at least one event rule parameters zone;
   receiving, by the at least one event rule parameters zone, a selection of at least one event rule related to the at least one SDE;
   causing a display of an event relationship stage GUI window including at least one rule selection zone;
   receiving, by the rule selection zone, a selection of at least one workflow rule and at least one action, wherein the at least one workflow rule and the at least one action defines the event relationship as determined by the at least one event rule; and
   configuring the security application based on the selected at least one workflow rule and the selected at least one action.

2. The method of claim 1, further comprising:
   upon receiving the selections, generating the security application.

3. The method of claim 1, wherein each security phase zone is associated with any of: a detection phase, an investigation phase, and a mitigation phase.

4. The method of claim 1, wherein each selection is received via a user gesture by the user, wherein the user gesture includes at least one dragging and dropping of an icon into one of the zones.

5. The method of claim 1, wherein each of the at least one action is any of: executing a security phase, executing one of the at least one security service, executing one of the at least one SDE, reporting information related to a potential security threat, ceasing execution of the at least one security service or the at least one SDE, creating a group event, terminating operation of the application, and resetting operation of the application.

6. The method of claim 5, wherein the group event defines a correlation of events, further comprising:

receiving, by the rule selection zone, a selection of the group event.

7. The method of claim 1, wherein the rule selection zone further allows a selection of at least one correlation rule, wherein each correlation rule defines the correlation between events generated by the at least one SDE.

8. The method of claim 7, wherein the at least one action is performed based on the at least one workflow rule and the at least one correlation rule.

9. The method of claim 1, further comprising:
generating a high-level programmable code based on the at least one security service, the at least one SDE, and the at least one rule selected via the GUI;
translating, by a security stack, the high-level programmable code into a set of instructions compatible with a plurality of network elements participating in each security phase associated with the at least one security phase zone; and
communicating the set of instructions to a plurality of respective drivers of the plurality of network elements.

10. The method of claim 1, further comprising:
customizing the security application via the GUI.

11. A non-transitory computer readable medium having stored thereon instructions for causing one or more processing units to execute a method for programmably creating a security application via a graphical user interface (GUI), comprising:
causing a display of a service stage GUI window including at least one security phase zone;
receiving, by the at least one security phase zone, a selection of at least one security service including at least one security decision engine (SDE);
causing a display of an event rule stage window including at least one event rule parameters zone;
receiving, by the at least one event rule parameters zone, a selection of at least one event rule related to the at least one SDE;
causing a display of an event relationship stage GUI window including at least one rule selection zone;
receiving, by the rule selection zone, a selection of at least one workflow rule and at least one action, wherein the at least one workflow rule and the at least one action defines the event relationship as determined by the at least one event rule; and
configuring the security application based on the selected at least one workflow rule and the selected at least one action.

12. A system for programmably creating a security application via a graphical user interface (GUI), comprising:
a processing unit; and
a memory, the memory containing instructions that, when executed by the processing unit, configure the system to:
cause a display of a service stage GUI window including at least one security phase zone;
receive, by the at least one security phase zone, a selection of at least one security service including at least one security decision engine (SDE);
cause a display of an event rule stage window including at least one event rule parameters zone;
receive, by the at least one event rule parameters zone, a selection of at least one event rule related to the at least one SDE;
cause a display of an event relationship stage GUI window including at least one rule selection zone;
receive, by the rule selection zone, a selection of at least one workflow rule and at least one action, wherein the at least one workflow rule and the at least one action defines the event relationship as determined by the at least one event rule; and
configure the security application based on the selected at least one work rule and the selected at least one action.

13. The system of claim 12, wherein the system is further configured to:
upon receiving the selections, generate the security application.

14. The system of claim 12, wherein each security phase zone is associated with any of: a detection phase, an investigation phase, and a mitigation phase.

15. The system of claim 12, wherein each selection is received via a user gesture by the user, wherein the user gesture includes at least one dragging and dropping of an icon into one of the zones.

16. The system of claim 12, wherein each of the at least one action is any of: executing a security phase, executing one of the at least one security service, executing one of the at least one SDE, reporting information related to a potential security threat, ceasing execution of the at least one security service or the at least one SDE, creating a group event, terminating operation of the application, and resetting operation of the application.

17. The system of claim 16, wherein the system is further configured to:
receive, by the rule selection zone, a selection of the group event.

18. The system of claim 12, wherein the rule selection zone further allows a selection of at least one correlation rule, wherein each correlation rule defines the correlation between events generated by the at least one SDE.

19. The system of claim 18, wherein the at least one action is performed based on the at least one workflow rule and the at least one correlation rule.

20. The system of claim 12, wherein the system is further configured to:
generate a high-level programmable code based on the at least one security service, the at least one SDE, and the at least one rule selected via the GUI;
translate, by a security stack, the high-level programmable code into a set of instructions compatible with a plurality of network elements participating in each security phase associated with the at least one security phase zone; and
communicate the set of instructions to a plurality of respective drivers of the plurality of network elements.

21. The system of claim 12, wherein the system is further configured to:
customize the security application via the GUI.

* * * * *